US012689326B2

(12) United States Patent
Gibb et al.

(10) Patent No.: US 12,689,326 B2
(45) Date of Patent: Jul. 21, 2026

(54) RIGID-FRAMED FLEXIBLE PANEL SOLAR ARRAY

(71) Applicant: Lockheed Martin Corporation, Bethesda, MD (US)

(72) Inventors: John L. Gibb, Sunnyvale, CA (US); Phuc Huu Phan, San Jose, CA (US); Devon John Gibb, Sunnyvale, CA (US); Egan Chiu, Alameda, CA (US); Montgomery Michael Perry, Boulder Creek, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 134 days.

(21) Appl. No.: 18/515,853

(22) Filed: Nov. 21, 2023

(65) Prior Publication Data

US 2025/0167724 A1     May 22, 2025

(51) Int. Cl.
| | |
|---|---|
| *H02S 30/20* | (2014.01) |
| *B64G 1/44* | (2006.01) |
| *H02S 30/10* | (2014.01) |

(52) U.S. Cl.
CPC .............. *H02S 30/20* (2014.12); *B64G 1/443* (2013.01); *H02S 30/10* (2014.12)

(58) Field of Classification Search
CPC .................................. H02S 30/20; H02S 30/10
See application file for complete search history.

(56) References Cited

U.S. PATENT DOCUMENTS

| | | | | |
|---|---|---|---|---|
| 4,155,524 A | * | 5/1979 | Marello | ............... B64G 1/2224 |
| | | | | 244/172.6 |
| 4,293,731 A | | 10/1981 | Schweig et al. | |
| 5,785,280 A | | 7/1998 | Baghdasarian | |
| 6,311,930 B1 | | 11/2001 | Hersh et al. | |
| 8,387,921 B2 | * | 3/2013 | Taylor | .................... B64G 1/443 |
| | | | | 244/172.6 |
| 2019/0084601 A1 | * | 3/2019 | Green | ....................... B62B 3/02 |

FOREIGN PATENT DOCUMENTS

| | | | |
|---|---|---|---|
| GB | 2038923 A | | 7/1980 |
| JP | S58188800 | * | 11/1983 |
| JP | S58188800 A | | 11/1983 |

* cited by examiner

*Primary Examiner* — Jayne L Mershon

(57) ABSTRACT

Provided herein are various enhancements for solar panels and photovoltaic array assemblies. In one example, a system includes solar panel assemblies each comprising a frame defining a mounting area formed from modular segments having receiving features configured to accept spline elements that mount a perimeter of a flexible photovoltaic panel into the mounting area and apply a radial tension to the flexible photovoltaic panel. A stowage mechanism is configured to hold the solar panel assemblies in a stacked configuration and comprising a rod assembly disposed through apertures in the frames of each of the solar panel assemblies. A deployment mechanism is configured to deploy the solar panel assemblies from the stacked configuration into a deployed configuration and comprising self-opening hinges attached between selected pairs of the frames.

17 Claims, 15 Drawing Sheets

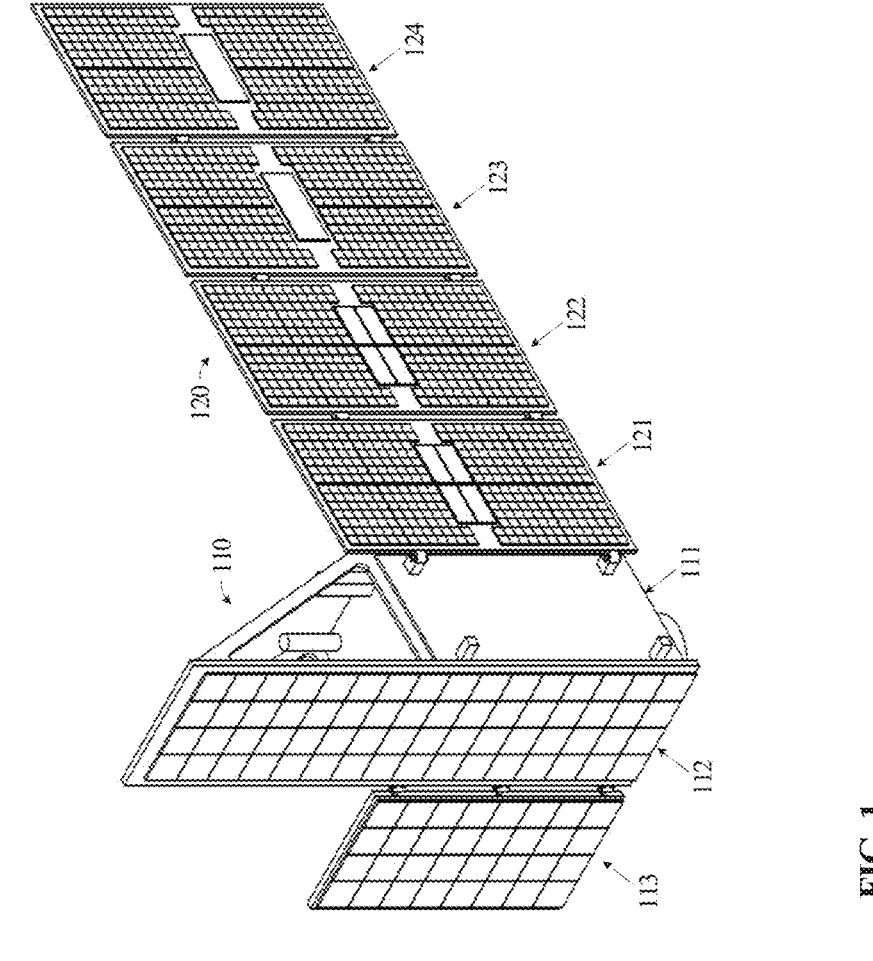
FIG. 1
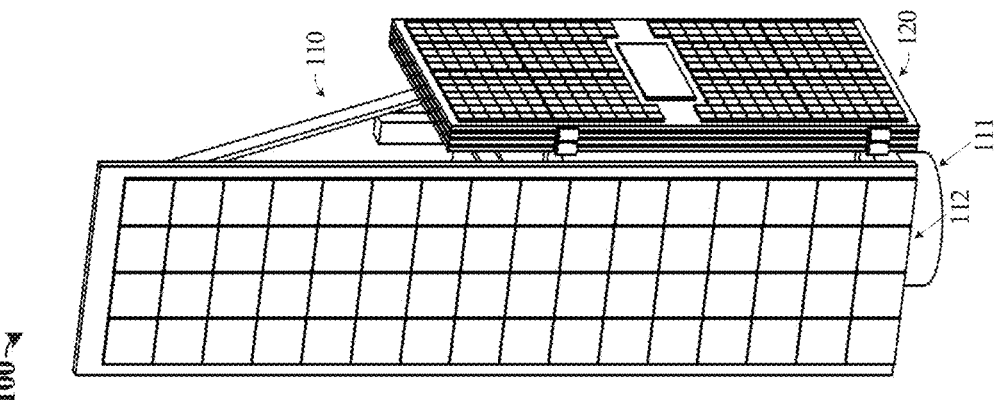

RIGID-FRAMED FLEXIBLE PANEL SOLAR ARRAY

TECHNICAL BACKGROUND

Photovoltaic cells have been employed to form solar arrays on satellites, space probes, or space vehicles and provide electrical power to on-board systems. However, use of photovoltaic arrays has always been challenging due to the severe packaging, weight, and deployment requirements of launching to space. Often, rolled or folded solar arrays are packaged to fit into an envelope of a launch vehicle fairing, and then unfurled once in orbit or in space. Rigid panel arrays can also be employed, such as those formed with rigid honeycomb panels.

Various types of compact and deployable solar arrays have been devised over the years. These include umbrella arrays, Scheel fold-type arrays (hub folded "wrap rib"), flat segmented fan arrays, fold-up fan arrays, conic roll-up arrays, Kaplan-type arrays (U.S. Pat. No. 4,030,102), Ultraflex arrays (U.S. Pat. No. 5,296,044), or hybrid designs with flexible solar cells attached to a rigid backplate (U.S. Pat. No. 5,785,280), and others. However, all of the aforementioned array types have various drawbacks and limitations. For example, the Ultraflex hub-deployed circular flexible arrays employ complex hubs with many mechanisms and moving parts which do not scale in size easily. One solar array example is the Multi-Mission Modular Array (U.S. Pat. No. 10,546,967), which is a solar array with multiple deployment mechanisms to extend a Z-folding flexible rectangular-shaped blanket, and the blanket is tensioned between two spreader bars. Another solar array example is the Roll Out Solar Array (ROSA) flexible array (U.S. Pat. No. 9,604,737), which is deployed from tightly packed rolls to a rectangular-shaped blanket. The iROSA arrays of the International Space Station employ such technology. However, the ROSA type of arrays remain quite non-rigid and flexible even after deployment, and require a small radius of curvature for the relatively fragile photovoltaic materials while in the stowed configuration, which requires use of a backer foam material which can degrade over time and cause thermal problems in use.

SUMMARY

Enhanced solar array and panel configurations are discussed herein that include a flexible photovoltaic panel held into a rigid modular frame which exerts a circumferential force onto the flexible panel. This arrangement applies a radial tension to the membrane using modular expansion members assembled into the frame perimeter. Many such panels can be coupled via self-deploying hinges which can then be folded into a "stacked" stowed arrangement. A stowage mechanism can be included to hold the many stacked panels until deployment is commanded. When attached to a vehicle, such as a spacecraft, the stacked assembly can be deployed autonomously once the stowage mechanism is released. Such enhanced arrangements provide for high power/weight and high power/stowed volume arrays for small to medium sized satellites used in constellations, although these arrangements can be applied to various types of satellites or spacecraft in any orbit, having various sizes and scales.

In one example, a system includes solar panel assemblies each comprising a frame defining a mounting area formed from modular segments having receiving features configured to accept spline elements that mount a perimeter of a flexible photovoltaic panel into the mounting area and apply a radial tension to the flexible photovoltaic panel. A stowage mechanism is configured to hold the solar panel assemblies in a stacked configuration and comprising a rod assembly disposed through apertures in the frames of each of the solar panel assemblies. A deployment mechanism is configured to deploy the solar panel assemblies from the stacked configuration into a deployed configuration and comprising self-opening hinges attached between selected pairs of the frames.

In another example, a solar panel assembly includes a frame defining a mounting area and formed from interconnected modular segments. A first portion of the interconnected modular segments comprises receiving features configured to accept spline elements positioned about a perimeter of a flexible photovoltaic panel that mount the flexible photovoltaic panel into the mounting area. A second portion of the interconnected modular segments comprises expansion members configured to establish a circumferential force about the frame and apply a radial tension to the flexible photovoltaic panel.

In yet another example, a method of forming a solar panel assembly is provided. The method includes forming a frame defining a mounting area and assembled from interconnected modular segments, and mounting a flexible photovoltaic panel into the mounting area by insertion of spline elements positioned about a perimeter of the flexible photovoltaic panel into receiving features positioned on first ones of the interconnected modular segments. Based on the flexible photovoltaic panel being mounted, second ones of the interconnected modular segments are configured to establish a circumferential force about the frame and apply a radial tension to the flexible photovoltaic panel.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a satellite with solar panels in an implementation.

DETAILED DESCRIPTION

Figure 2:
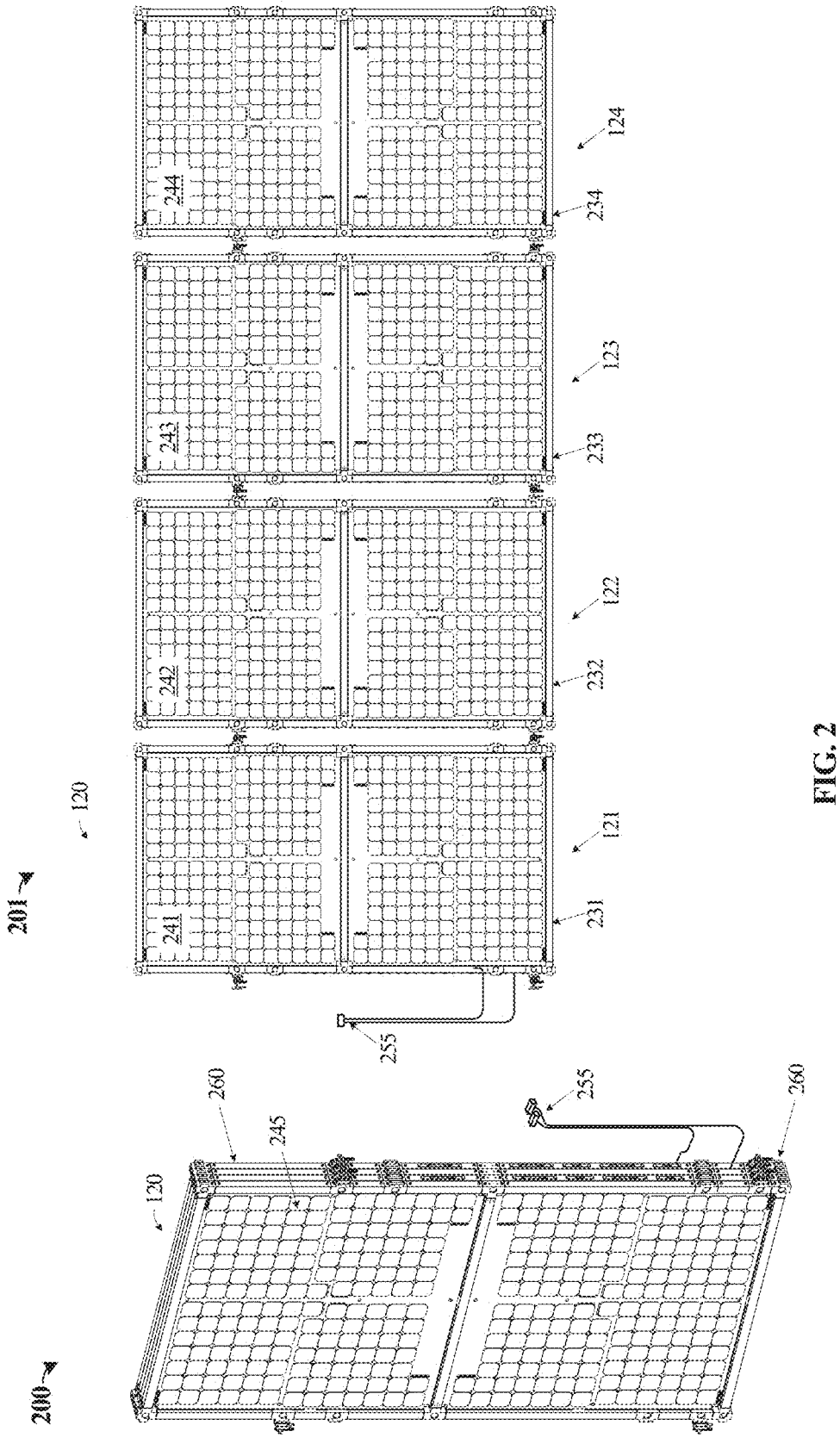
FIG. 2 illustrates folded/stacked solar panel assemblies in an implementation.

The examples herein provide enhanced assemblies, systems, and arrangements for deployable solar panels that include flexible photovoltaic panels. The implementations can reduce substrate costs and weight, while improving manufacturing processes. Specifically, the configurations herein are typically lighter in weight than composite panels, while being less expensive and easier to fabricate in a shorter time. Composite panels can be difficult and costly to manufacture, and the examples provide many alternative configurations that do not rely on these rigid-backed composite configurations. In the examples herein, photovoltaic solar cells are bonded to a flexible membrane substrate, such as a polyimide film (e.g., Kapton) or other film, or alternatively to flexible mesh substrates. The membrane substrate is then connected to a perimeter frame to provide stiffness as a panel assembly. Many panels can be interconnected with self-deploying features, such as spring-fitted hinges, to corresponding perimeter frames and then to a host spacecraft. Launch restraints (e.g., stowage assemblies) for the panels can be provided at the perimeter frames.

Turning now to a first example implementation, FIG. 1 is provided. FIG. 1 includes views 100 and 101 each illustrating satellite 110 which includes solar array 120 formed from several solar panel assemblies (121-124). Satellite 110 is an example of a spacecraft that can be deployed into an orbital configuration, along with one or more other satellites, such as to form a constellation of satellites. Other deployments and trajectories are possible, and other types of spacecraft can be employed. However, satellite 110 is typically launched in a stowed configuration as shown in view 100. Once satellite 110 reaches a predetermined point during launch or orbital positioning, deployment of various components can occur, as seen in view 101.

Satellite 110 includes various components, such as solar array 120, along with bus structure 111, and antenna arrays 112-113. Other various components common to satellites and spacecraft can be included, but are omitted from this discussion for clarity.

Satellite 110 may also include various structural or support elements, including bus structure 111, such as power conversion circuitry, power electronics, power controllers, orientation control elements, thermal control elements, and other various support circuitry and structures. Furthermore, satellite 110 can include various other power system elements that include components that provide electrical power. The electrical power might be derived from on-board generation systems, batteries, or radioisotope thermoelectric generators (RTG), thermoelectric generators (TEG), among other power generation systems. Further elements can be included to provide propulsion, orientation, and navigation elements that can comprise various equipment to move or orient satellite 110.

Satellite bus structure 111 comprises a chassis or mounting structure with underlying power distribution elements, logistical elements, and thermal control elements. Bus structure 111 might form the main body of satellite 110, with various components attached thereto. Bus structure 111 can include various launch and deployment features, such as for deploying satellite 110 from a launch vehicle to reach a desired orbital configuration. Bus structure 111 also may include thermal radiators which can dump heat into space according to on-board thermal control needs. Also, the logistical elements mentioned above might be included in bus structure 111 or attached thereto to provide changes to orientation, attitude, trajectory, orbit, or other movement.

Logistical elements can move, orient, or point satellite 110, move satellite 110 into different orbital configurations, adjust relative distances among different satellites, or perform station-keeping, reaction control, orientation, or attitude adjustments. Logistical elements can encompass bulk movement or propulsion systems, as well as reaction control systems (RCS). The logistical elements can receive guidance telemetry from external sensors or external sources, such as accelerometers, positioning sensors, gyroscopic sensors, and the like. The logistical elements can provide propulsion or guidance command and control to physical systems which alter positioning or orientation. Various engines, thrusters, inertial control and manipulation elements, or other elements capable of making adjustments to position, orientation, orbit, speed, or other movement parameters can be included. The logistical elements can also comprise distance sensing equipment or navigation equipment to determine relative distances from Earth or from other satellites. This distance sensing equipment or navigation equipment can comprise laser ranging equipment, radar equipment, or signal strength sensing equipment. Further examples can employ systems to determine geographic coordinates using one or more global positioning systems (GPS, GLONASS, Galileo), star-tracking systems, visual tracking systems, accelerometer-based tracking systems, or dead-reckoning systems, among others.

Solar array 120 comprises one or more sets of photovoltaic cells arranged on solar panel assemblies 121-124 which are configured to convert incident solar illumination to electrical power. This electrical power can be provided to various on-board systems of satellite 110, such as the elements described herein as well as various payload elements, scientific instruments, communication and ranging elements, monitoring and control elements, as well as various propulsion, guidance, orientation, station-keeping, reaction control, attitude adjustment, and orbital adjustment elements. The composition of the photovoltaic cells might vary based on application, but can include semiconductor-based photovoltaic cells, silicon-based photovoltaic cells, III-V compound semiconductors based solar cells, polycrystalline solar cells, heterojunction solar cells, perovskite solar cells (PSCs), or others.

As the examples herein discuss, solar panel assemblies 121-124 each comprise a rigid modular frame which houses a flexible photovoltaic panel. Individual solar panel assemblies can be coupled to other solar panel assemblies using hinges which can self-open or self-deploy. During a stowage configuration (view 100), solar panel assemblies 121-124 can be in a stacked and/or folded configuration. Then, a commanded deployment can occur which releases a stowage mechanism and allows for unfolding of solar panel assemblies 121-124 into a generally planar or unstacked configuration (view 101). Solar panel assemblies 121-124 can generate electrical power during stowage and deployment, with a smaller quantity of solar panel assemblies 121-124 able to receive incident solar illumination during stowage.

FIG. 2 shows a more detailed view of solar panel assemblies 121-124 in a stowed configuration (view 200) and a deployed configuration (view 201). As discussed above, solar array 120 comprises one or more sets of photovoltaic cells arranged on solar panel assemblies 121-124 which are configured to convert incident solar illumination to electrical power. This electrical power can be provided to various on-board systems of a satellite over wiring harness 255, which can couple to power handling circuitry or control electronics mounted to each solar panel assembly.

In view 200, solar array 120 is shown in a stowed configuration having individual solar panel assemblies folded and stacked. This stowed configuration can be maintained using a rod element inserted perpendicularly through the frames of each solar panel assembly, such as through into one or more of the segments having apertures (e.g., corner segments 260). Solar array 120 can be placed into a deployed configuration, shown in view 201.

In view 201, solar panel assemblies 121-124 are deployed into a generally planar or flat arrangement, which can be positioned to allow for solar illumination and power generation by the included photovoltaic cells. An example photovoltaic cell 245 is labeled in view 200. Each of solar panel assemblies 121-124 include flexible panels 241-244 mounted into rigid frames 231-234. Flexible panels 241-244 can have photovoltaic cells and panel electronics 251-254 mounted thereto, which handles power control and handling for each panel and routes output power for each panel assembly to wiring harness 255. Flexible panels 241-244 can comprise a membrane, fabric, or other flexible substrate, such as polyamide, Kapton, mesh, fabric, and the like, which provide for flexibility and non-rigidity. Similar materials used for rolled solar arrays can be employed. Advantageously, the flexible photovoltaic panels fitted into the rigid frames provide for a 'hybrid' approach which allows for stowage and deployment like fully rigid panels, but with the lower cost and higher manufacturability of flexible panels, among other advantages discussed herein.

Frames 231-234 each define a mounting area for the corresponding flexible photovoltaic panels. Frames 231-234 can be formed from modular segments or fittings which nest or interconnect into each other. Frames 231-234 have receiving features configured to accept rod elements that mount a perimeter of a corresponding flexible photovoltaic panel into the mounting area and apply a radial tension to the flexible photovoltaic panel. This radial tension can be established by expansion segments included among the modular segments forming each frame, where the expansion segments apply a circumferential expansion to the frame that acts to 'expand' the frame perimeter which is translated into a radial stress or tension on the mounted flexible photovoltaic panel.

Figure 3:
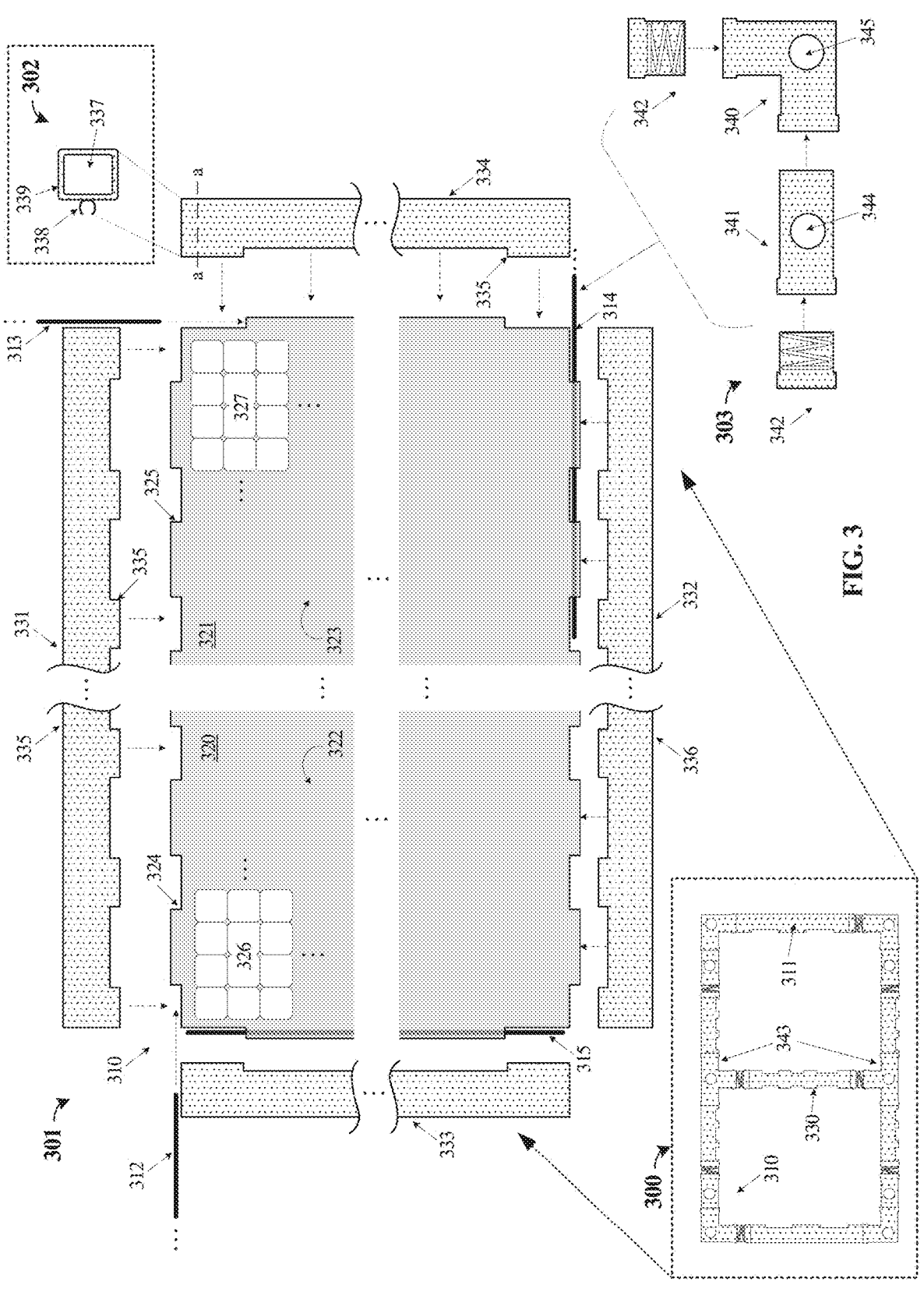
FIG. 3 illustrates assembly techniques for a solar panel assembly in an implementation.

FIG. 3 is included to illustrate configurations and example manufacturing or assembly techniques that mount a flexible photovoltaic panel into a rigid modular frame, such as for solar panel assemblies 121-124. FIG. 3 includes view 300 showing an overview of an assembled frame 311 of solar panel assembly 310, view 301 showing a partial assembly of frame 311 with flexible photovoltaic panels 320-321, view 302 showing a cross-sectional view of a modular perimeter segment used to form solar panel assembly 310, and view 303 showing example modular segments that form solar panel assembly 310.

Turning first to view 300, solar panel assembly 310 includes several modular segments forming a perimeter frame 311, which are configured to mount flexible photovoltaic panels 320-321 (omitted from view 300). View 303 shows example modular segments 340-342 employed at or near the corners of frame 311. The configuration shown in view 300 includes expansion segments 342 applied at various locations about frame 311, and a different quantity or arrangement of expansion segments 342 can be included. Similar configurations can be provided for modular segments 343 regarding expansion segments 342.

During assembly, flexible photovoltaic panels 320-321 are mounted into perimeter segments that form a portion of the frame, with some examples of this mounting illustrated in FIG. 3 and discussed below. Additionally, the modular segments that form the frame can be assembled by inserting nestable portions into each other, to form an interconnected perimeter frame. Other assembly techniques are possible, such as welded joints, screws/fasteners, snap-fit elements, and adhesive-joined modules, among others. However, the frame, while rigid in certain directional axes, does provide for a circumferential expansion or "hoop tension" to be applied to expand along the perimeter of the frame for each membrane. This circumferential expansion can be applied using individual modular segments along edges of the frame that comprise springs or other expanding elements. Thus, based on being assembled, the perimeter of the frame is placed under expansion stress and expands circumferentially, which puts a corresponding radial tension onto flexible photovoltaic panels at the corresponding mounting tabs. The rigidity provided by the frame is thus in non-circumferential axes, such as maintaining a planarity of the entire panel assembly, as well as by the equilibrium established between the radial force exerted on a flexible photovoltaic panel and expansion segments of the frame.

Frame 311 comprises several modular segments. These include perimeter segments, also referred to as rails, which form the bulk of the linear edges of the frame, namely segments 330-336 (seen in view 301). Outer perimeter segments include segments 331-336 and optional cross-member (internal perimeter) segments include segment 330. The perimeter segments are joined to each other into a generally rectangular arrangement with various other modular segments, which include corner or "L" segments 340, "I" segments 341, expansion segments 342 (seen in view 303), and "T" segments 343. Segments 343 and cross-member segment 330 are omitted from view 301 to allow for expanded details on the corner portions, and these segments can be seen in view 300. Other examples might have additional "T" segments to join two frames together or for mounting of the frame to external elements, or additional "I" segments to extend a frame length, provide for additional expansion elements and corresponding hoop tension, or to provide for additional hinge attachment points. The various modular segments can include apertures or holes through a body member, shown for examples 344-345, which can be used for stowage and deployment of the frame when coupled to one or more additional frames. Also, these modular segments can include mounting features for securing hinge assemblies to a corresponding frame, such as dovetail features for slide-fit hinges, slots, or other features for screws, fasteners, and other mounting formats.

Frame perimeters segments 330-336 include mounting features for securing flexible photovoltaic panels or associated membranes thereto. View 302 shows one example structure to fasten flexible photovoltaic panel 321 into perimeters segments 330-334. Similar techniques and structures described for attachment of flexible photovoltaic panel 321 can be applied to flexible photovoltaic panel 320 and segments 330, 333, 335, and 336. In view 302, which includes a cross-sectional view of perimeter segment 334, receiving features comprising a slot or channel 338 is formed on an inner edge of wall 339 of perimeter segment 334, which otherwise comprises a tubular configuration with walls 339 surrounding hollow core 337. A spline is inserted into loops or tabs of flexible photovoltaic panel 321, and then the spline/tab is press-fit into channel 338. Channel 338 then retains the spline/tab after insertion. In some configurations, channel 338 is slightly deformed by insertion of the spline/tab, but reverts to an undeformed arrangement after insertion is complete. In this configuration, channel 338 provides a flexible channel that can then retain the spline/tab to a certain predetermined insertion or release force. The spline/tab may optionally be configured to slide in channel 338 after insertion. In other configurations, channel 338 is deformed by insertion of the spline/tab but remains deformed after insertion, placing a continuous force onto the spline/tab and preventing sliding (along the spline axis) of flexible photovoltaic panel 321 from friction/pressure of the deformed channel. Regardless of the mounting technique, a spline/tab of flexible photovoltaic panel 321 can be held into the frame, and a radial tension can then be applied to flexible photovoltaic panel 321 by the channels acting on the spline/tab held within.

View 301 shows four perimeter sides (with cross-member 330 omitted for clarity), each comprising a perimeter segment which has corresponding channels for mounting to a spline/tab of a corresponding side of a flexible photovoltaic panel. Splines 312-314 are shown at various stages of assembly and insertion into the tabs of a corresponding side of the flexible photovoltaic panels. While individual splines for each side and each flexible panel can be employed, as shown in FIG. 3, other configurations are possible. These other options include a single spline which is bent or formed to fit into tabs of more than one side of a flexible photovoltaic panel or more than one panel, which can include a rectangular hoop or ring configuration, as well as splines which encompass 1, 2, 3, or 4 sides, or less than one side. Once frame 311 has been assembled and flexible photovoltaic panels 320-321 have been installed, expansion segments 342 act to expand frame 311 and exert a hoop stress or circumferential expansion onto frame 311, which translates to a radial tension applied to flexible photovoltaic panels 320-321.

Flexible photovoltaic panel 320 comprises flexible substrate 322 having tabs 324 formed along a perimeter, and also includes an array of photovoltaic cells 326 affixed to flexible substrate 322. Flexible photovoltaic panel 321 comprises flexible substrate 323 having tabs 325 formed along a perimeter, and also includes an array of photovoltaic cells 327 affixed to flexible substrate 323. Tabs 324-325 can take different configurations depending on the implementation, such as those noted above. However, in this example, tabs 324-325 comprise loops or folds formed by or into the material of a membrane or flexible substrate, which can accept a mounting spline therethrough, such as shown for mounting splines 312-315. Other examples might have loops or folds welded, sewed, adhered, or otherwise mounted to the perimeter of flexible substrates 321-322. Flexible substrates 321-322 comprises a membrane or fabric material, such as a polyimide film (e.g., Kapton), mylar film, various fabrics, scrim fabric, or various flexible mesh substrates. Flexible photovoltaic panels can also include various other components, such as wiring, interconnect, flexible bonding layers, coatings, protection layers, diode board components, wiring harnesses, or other elements.

Figure 4:
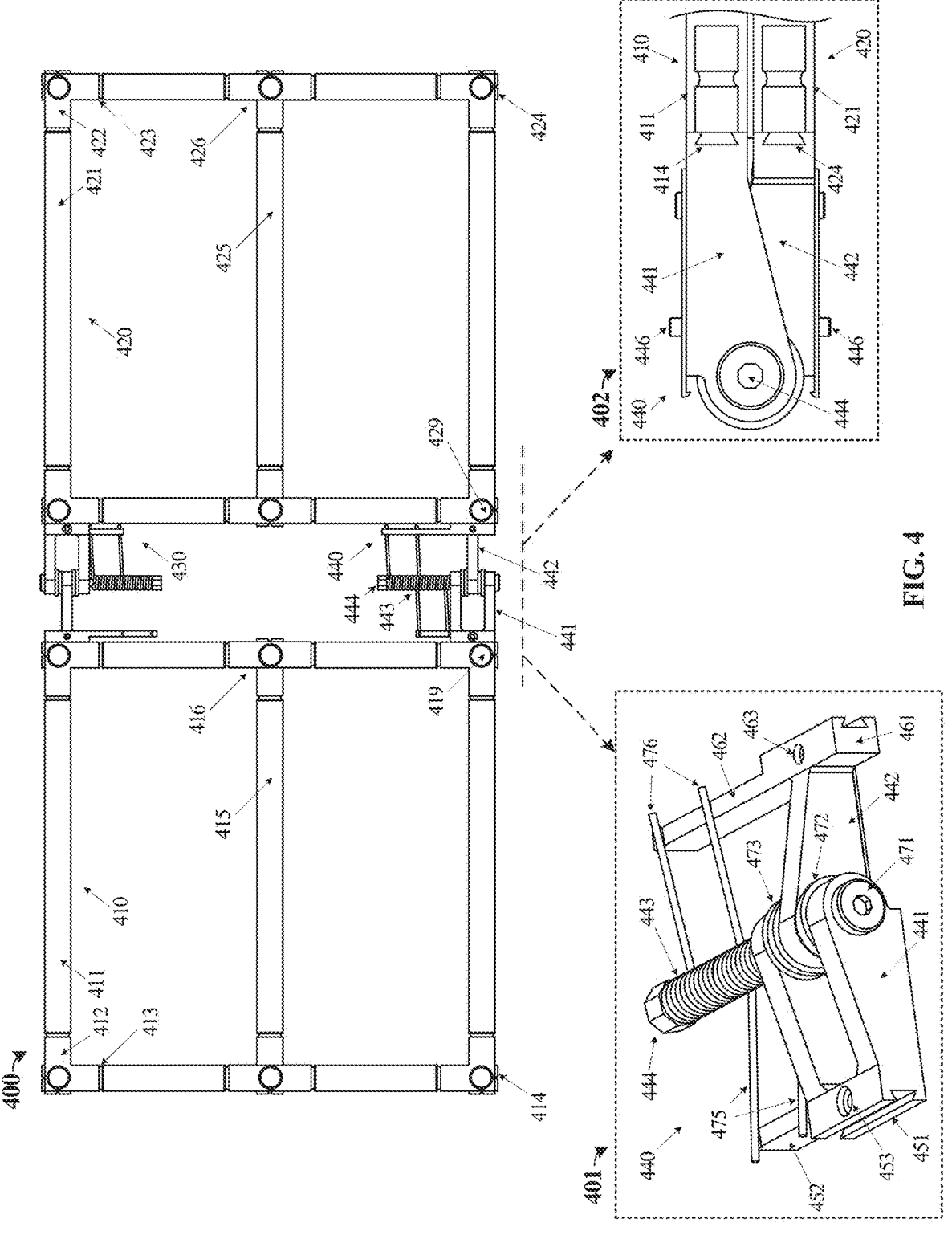
FIG. 4 illustrates frame and hinge features for solar panel assemblies in an implementation.

FIG. 4 illustrates additional examples of frames formed from modular segments, and hinge assemblies employed to couple more than one frame. Various elements can be seen in both views 400-402 for frames 410 and 420. Flexible photovoltaic panels are omitted from the examples in FIG. 4 for clarity, and it should be understood that such solar panels can be installed into corresponding frames.

View 400 includes frames 410 and 420 coupled by hinge assemblies 430 and 440, with frames 410 and 420 in a "deployed" or open configuration having a generally planar arrangement. The deployed configuration in view 400 shows hinge assemblies 430 and 440 extended/opened to provide for a generally flat/planar arrangement of frames 410 and 420. Frames 410 and 420 include perimeter segments 411, 415, 421, and 425 joined by corner (L) segments 412/422 and junction (T) segments 416/426 with expansion segments 413/423 installed/embedded (partially hidden from view) between corresponding segments 411/421, 412/422, and 416/426. Stowage apertures 419/429 can have a stowage rod element inserted therethrough, as will be discussed in FIGS. 12-14 below. Also included on segments 412/422 and 416/426 are hinge mounting features, with hinge assemblies 430 and 440 mounted as shown on selected corner segments, although hinges can be mounted to T segments in other examples.

Hinge assemblies 430 and 440 can include deployment features, such as pre-loaded or self-opening configurations which employ motors or torsion springs to move apart leaves or clevis portions of the hinges when not held in a closed arrangement. For hinge assembly 440, first leaf 441 is attached to frame 410 and second leaf 442 is attached to frame 420. This example employs a spring to move apart corresponding leaves, but other examples can include dampers, or alternatively, deployment motors/servos. Spring element 443 is shown as a torsion spring placed over pivot 444 with fingers that can extend to contact points on each of first leaf 441 and second leaf 442. Also, hinge assemblies 430 and 440 can be installed by sliding onto mounting features, such as those shown for elements 414/424, which may include a sliding dovetail arrangement, among other mounting arrangements. View 401 shows additional details on hinge assembly 440, which also can apply to those of hinge assembly 430. Specifically, hinge assembly 440 includes leaves 441 and 442 which rotate about pivot 444. Leaf 441 includes a clevis configuration having two fork members which fit a fork member from leave 442 therebetween. Also, leaf 441 includes mounting member 451 comprising a dovetail configuration for mounting to a corresponding frame, along with mounting hole 453 and finger member 452. Spring 443 has finger extensions 475-476 which interface with corresponding finger member 452 of leaf 441 and finger member 462 of leave 442. These finger members provide a portion of leaves 441-442 against which spring 443 can act to provide an opening force. Leaf 442 also includes mounting member 461 comprising a dovetail configuration for mounting to a corresponding frame, along with mounting hole 463. Pivot 444 also includes various elements to secure and provide movement in leaves 441-442, such as nuts, bolt heads, or other features, such as head 471 and bearings or washers 472-473.

View 402 shows a stacked or stowed configuration for frames 410 and 420, with hinge assembly 440 shown in a closed arrangement. View 402 also shows perimeter segments 411/421, hinge mounting features 414/424, and spring adjustments 446. Spring adjustments 446 can be included to provide locking for the hinge assembly in the open or deployed arrangement, or to adjust a spring force applied to the leaves. Expansion segments 413/423 are fitted between corresponding perimeter segments 411/421 and corner segments 412/422, and apply an expansion force between these corresponding segments. The intensity or magnitude of this expansion force can be set by a slot/pin configuration (see elements 418/428 in FIG. 5) which adjusts or selects an amount of pre-compression applied to a spring or other expansion element of the expansion segments.

Figure 5:
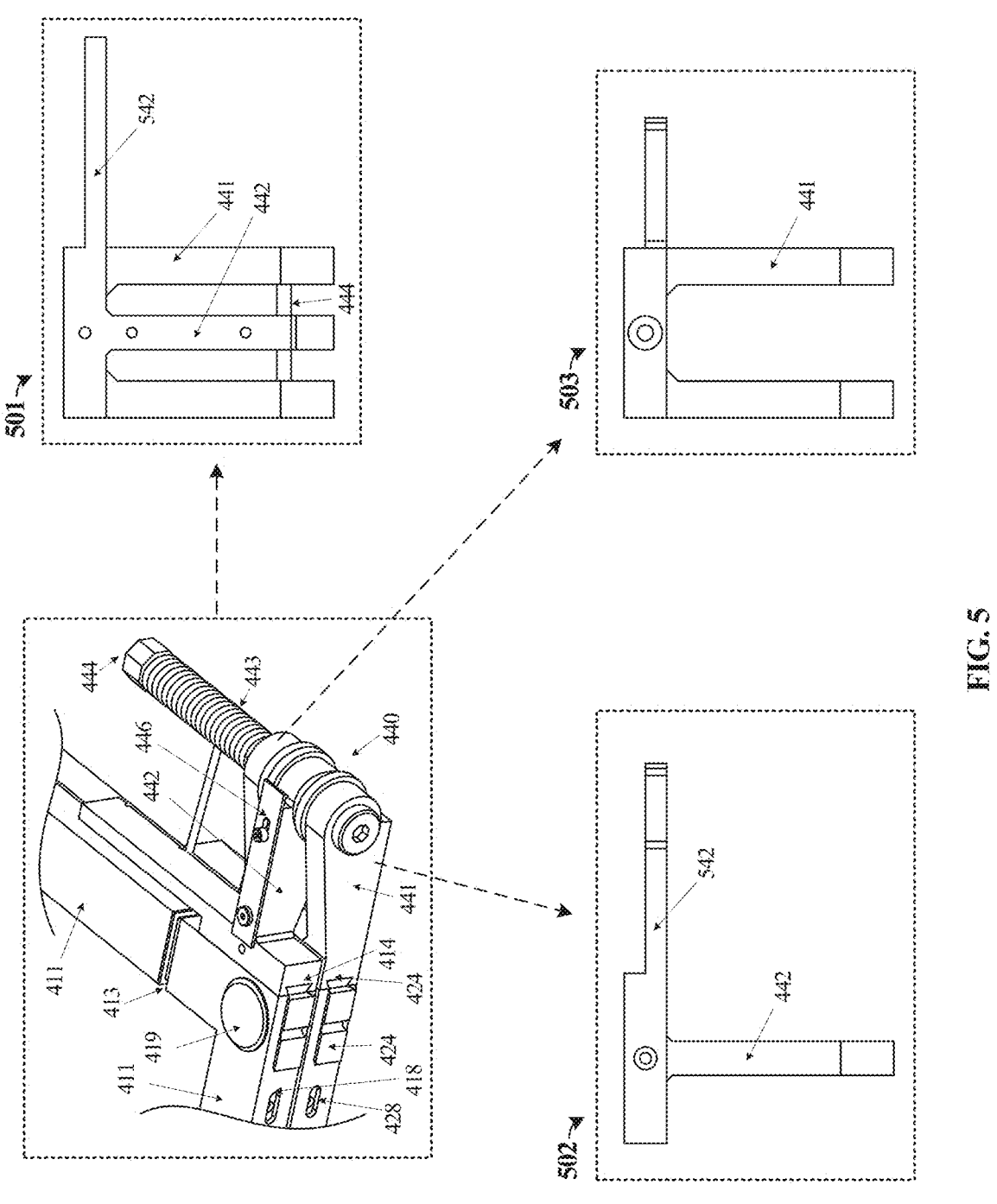
FIG. 5 illustrates hinge features for solar panel assemblies in an implementation.

FIG. 5 shows detailed views and component views of hinge assembly 440 attached to frames 410 and 420. View 500 includes an isometric view of hinge 440 and attachment details for frames 410 and 420. Views 501-503 show simplified top views of components of hinge 440 that highlight corresponding hinge leaf features.

View 501 shows a stacked or stowed configuration for frames 410 and 420, with hinge assembly 440 shown in a closed arrangement. View 501 also shows perimeter segments 411/421, hinge mounting features 414/424, and expansion adjustment slot 418/428. Expansion segments 413/423 are fitted between corresponding perimeter segments 411/421 and corner segments 412/422, and apply an expansion force between these corresponding segments. The intensity or magnitude of this expansion force can be set by a slot/pin configuration 418/428 which adjusts or selects an amount of pre-compression applied to a spring or other expansion element of the expansion segments. In view 501, a simplified top view of leaves 441-442 is shown to highlight the overlap and mounting with respect to pivot 444. View 502 shows an isolated top view of leaf 442, while view 503 shows an isolated top view of leaf 442.

Figure 6:
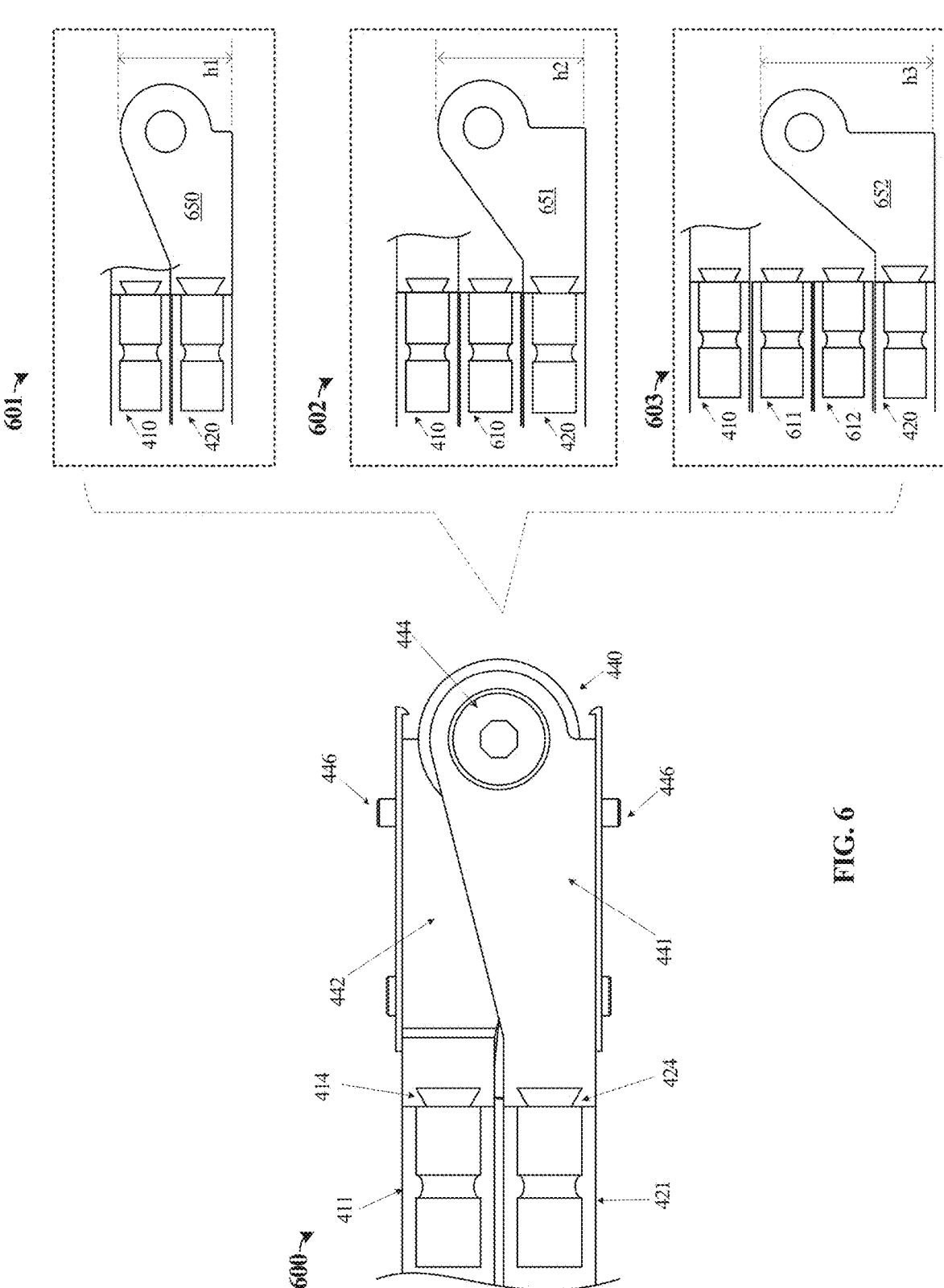
FIG. 6 illustrates hinge features for solar panel assemblies in an implementation.

FIG. 6 illustrates hinge assembly 440 in a similar configuration to that of view 402 of FIG. 4. However, FIG. 6 also includes three examples of leaf 441, also referred to as a clevis. The three examples, namely clevis elements 650-652 in views 601-603, can be selected based on a quantity of intervening frames which are stacked during stowage between frames that couple via hinge assembly 440. Views 601-603 comprise simplified representations of the corresponding elements, included to focus on the heights (h1, h2, and h3) of clevis elements 650-652.

In view 600, a stacked or stowed configuration for frames 410 and 420 is shown, with hinge assembly 440 in a closed state. View 402 also shows perimeter segments 411/421, hinge mounting features 414/424, and spring adjustments 446. Expansion segments 413/423 are fitted between corresponding perimeter segments 411/421 and corner segments 412/422.

In view 601 (as well as view 600), only frames 410 and 420 are included, which are coupled to each other via hinge assembly 440. Clevis element 650 is shown as having height h1, which corresponds to a baseline height for coupling two frames with no intervening stacked frames. In view 602, intervening frame 610 is included between frames 410 and 420 when in a stacked or stowed configuration, and clevis element 651 is shown as having height h2. Height h2 is greater than h1, typically by an amount corresponding to a height of frame 610, along with any associated frame spacing. Finally, view 603 shows intervening frames 611 and 612 included between frames 410 and 420 when in a stacked or stowed configuration, and clevis element 652 is shown as having height h3. Height h3 is greater than h1 and h2, typically by an amount corresponding to a height of frames 611-612, along with any associated frame spacing.

Thus, the examples in FIG. 6 show techniques and elements to provide for additional stacking of frames. This stacking can be employed when a multi-tier or multi-phase deployment of collection of solar panel assemblies is desired, such as that seen in FIG. 15. In such an arrangement, a first phase of deployment unfolds a first set of solar panel assemblies, and a second phase of deployment unfolds a second set of solar panel assemblies. The second set has a different set of hinge assemblies than those of the first set, and the unfolding or deployment process proceeds in a sequential manner. Moreover, the stacking of intervening panels provides for a more compact arrangement during stowage for launch and pre-deployment activities.

Figure 7:
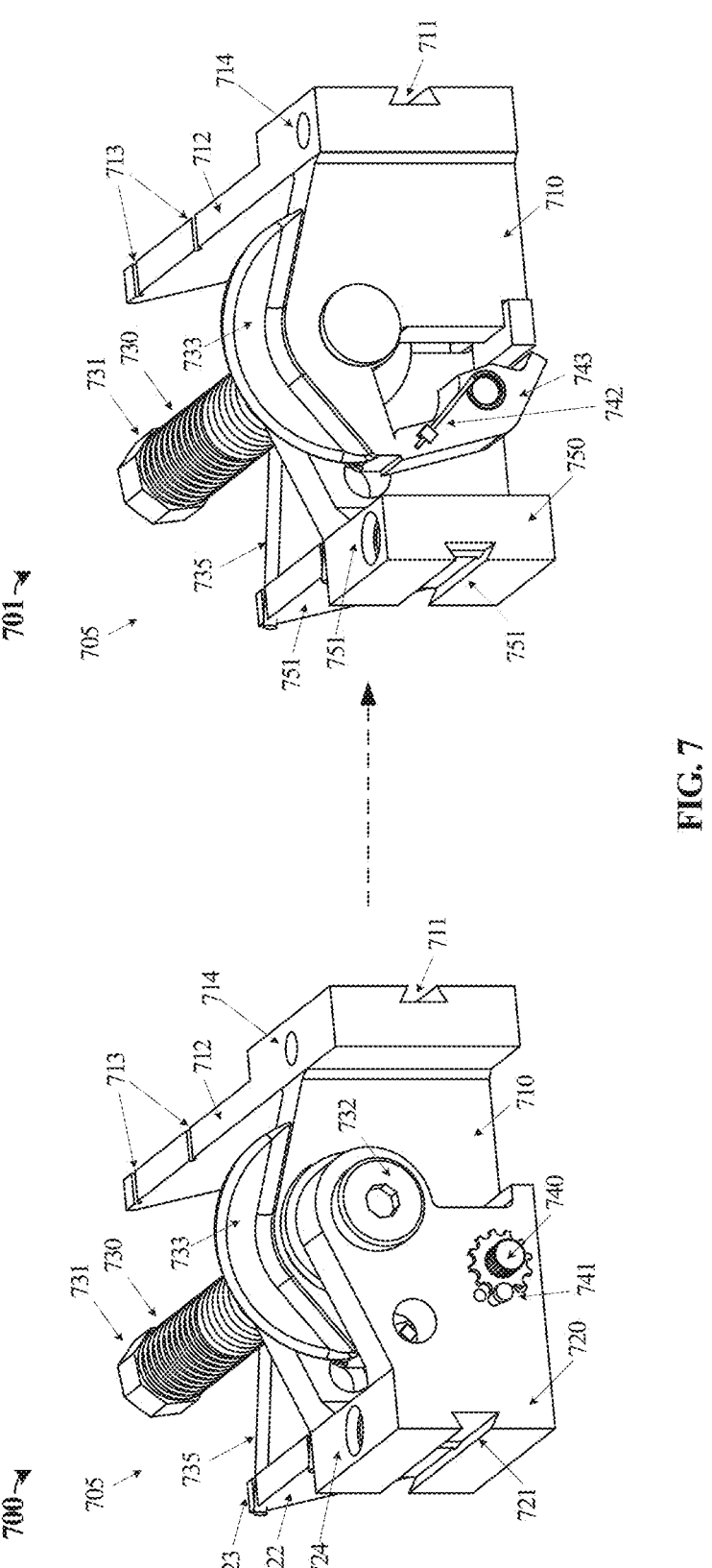
FIG. 7 illustrates hinge features for solar panel assemblies in an implementation.

FIG. 7 illustrates an additional example implementation of a hinge assembly, namely hinge assembly 705. Hinge assembly 705 can be an example implementation which can be employed on any of the example solar panel assemblies herein. In FIG. 7, a locking mechanism is included for hinge assembly 705 in views 700-701, with some elements similar to that of hinge assemblies 430 and 400.

View 700 is an isometric view showing hinge assembly 705, and view 701 is a partial cutaway view showing some internal components of hinge assembly 705. View 701 has a portion of leaves 710 and 720 removed to highlight internal locking mechanism components. In view 700, hinge assembly 705 includes leaves 710 and 720 coupled via pivot 731. Leaf 710 includes mounting feature 711, leaf body 712, spring connection points 713, and fastener hole 714. Leaf 720 includes mounting feature 721, leaf body 722, spring connection points 723, and fastener hole 724. Leaf 720 forms a clevis arrangement, which can be sized to accommodate a desired quantity of intervening panels. Spring 730 is included on pivot 731, which also includes end cap 732.

Hinge assembly 705 also includes latching or locking mechanism 740 which can latch or lock hinge assembly in an open or deployed configuration. This can ensure that attached panels/frames do not collapse or move into a closed or partially closed configuration after deployment is achieved. Moreover, a ratcheting or continuous locking feature can be included to ensure that if partial deployment is achieved, that reverse movement of the panels/frames on hinge assembly 705 is prevented. Thus, locking mechanism 740 is shown including a ratcheting/gear arrangement 741 in view 700, and internal spring 742 with lever arm 743 shown in cutaway view 701. During opening or deployment of hinge assembly 705, locking mechanism 740 operates with a combination of wheel 733 combined with internal spring 742, lever arm 743, and the ratchet/gear of locking mechanism 741.

Figure 8:
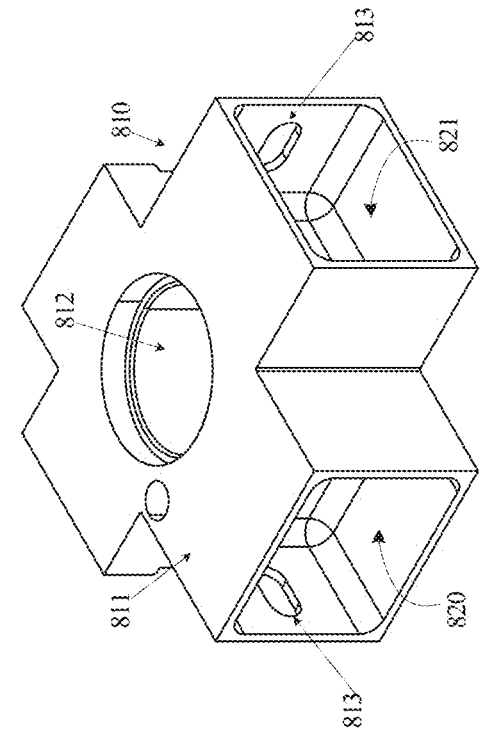
FIG. 8 illustrates L segment features for a solar panel assembly in an implementation.
Figure 8:
Figure 8:
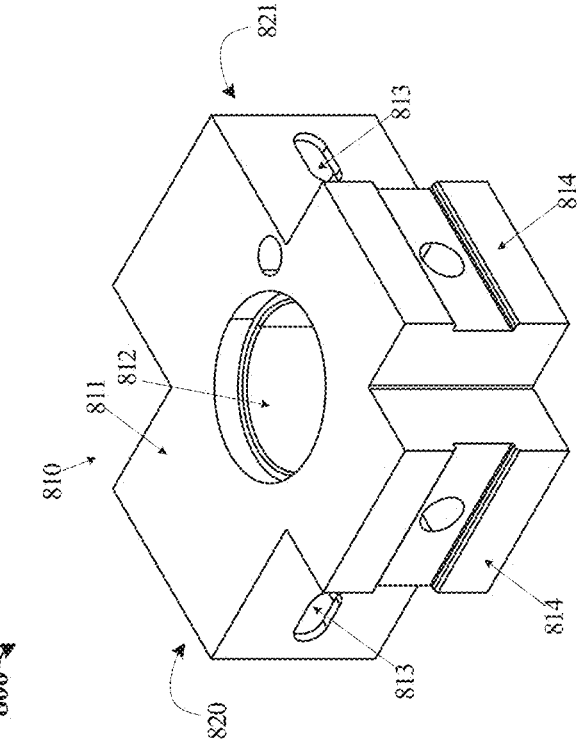
Figure 9:
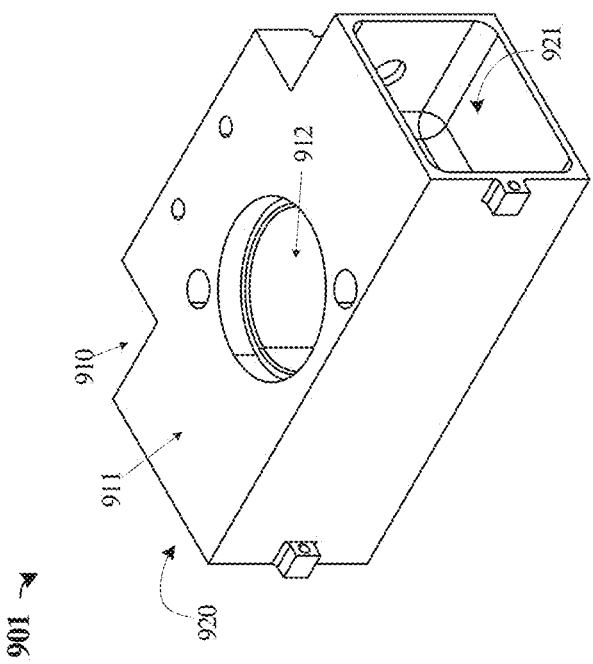
FIG. 9 illustrates I segment features for a solar panel assembly in an implementation.
Figure 9:
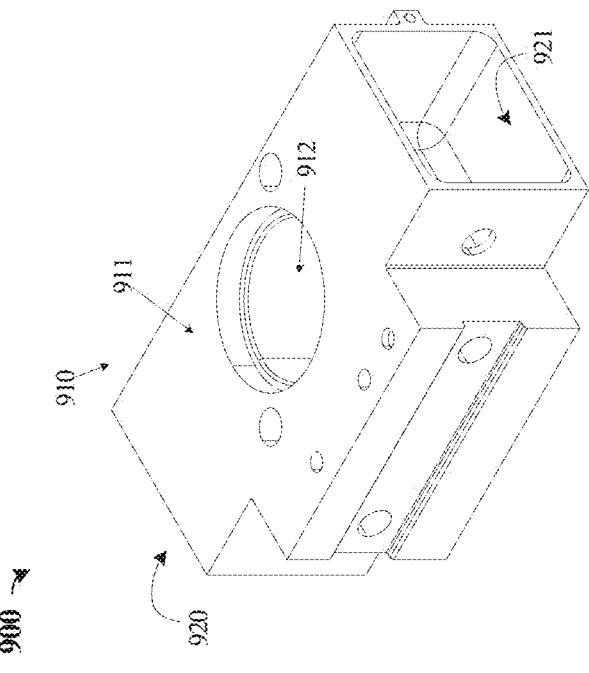
Figure 10:
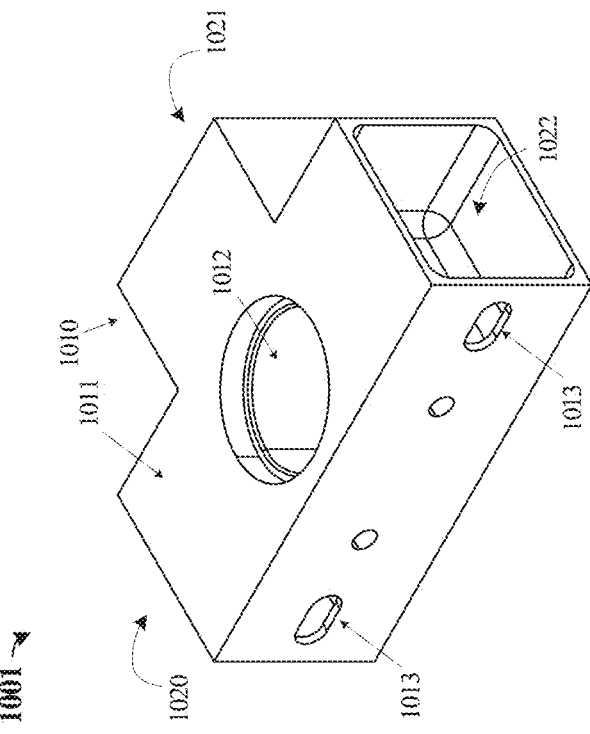
FIG. 10 illustrates T segment features for a solar panel assembly in an implementation.
Figure 10:
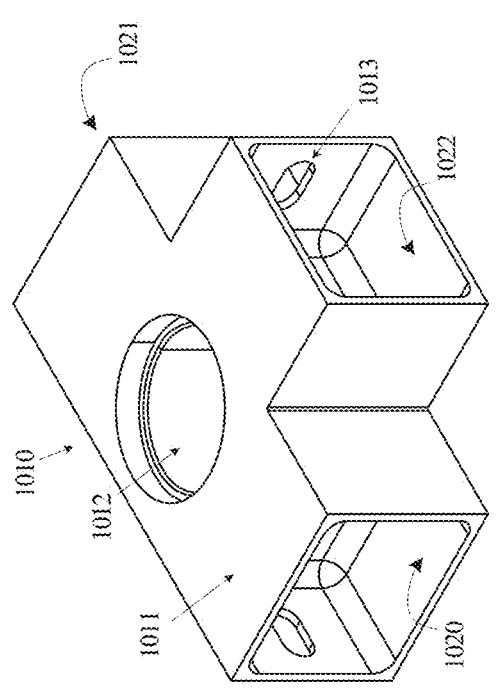
Figure 11:
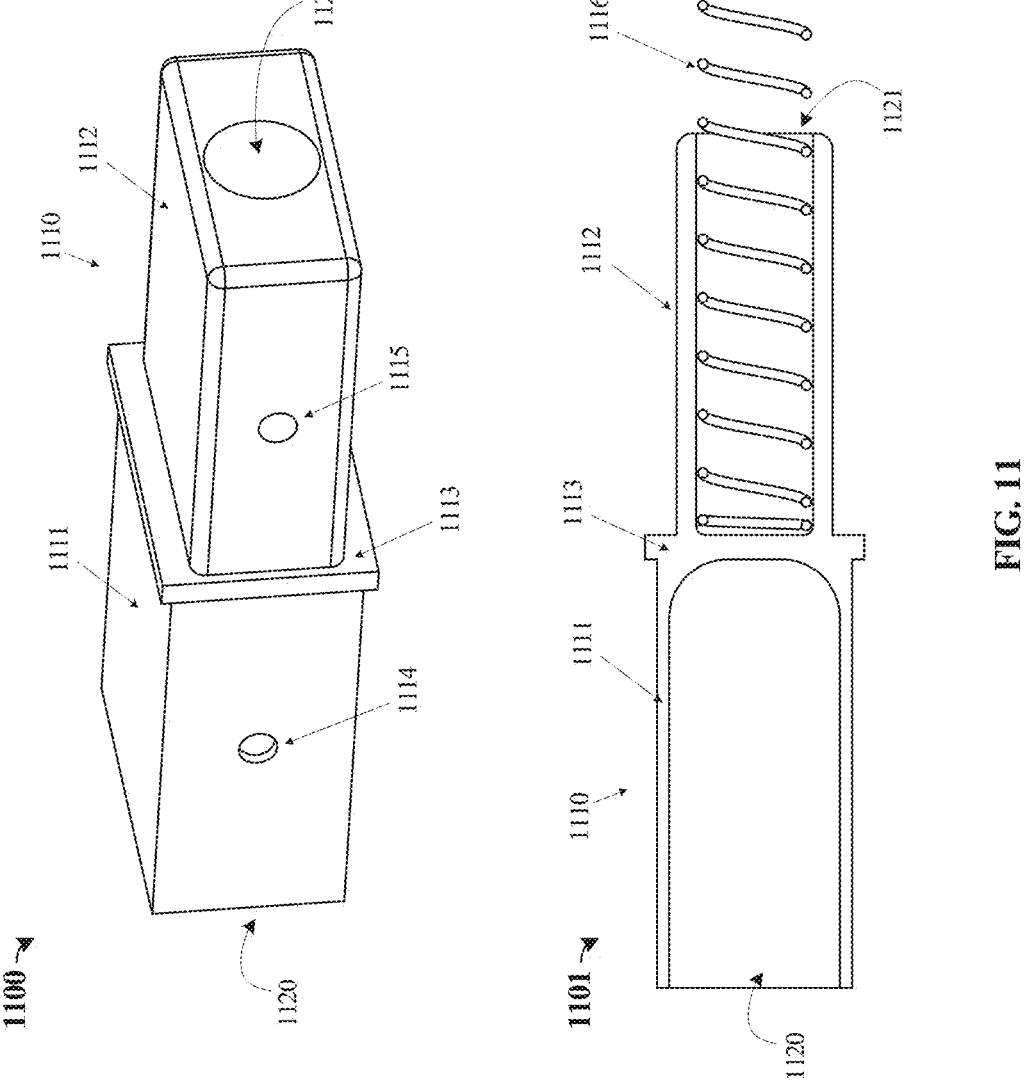
FIG. 11 illustrates expansion segment features for a solar panel assembly in an implementation.

FIGS. 8-11 feature example implementations of modular segments which can form the various frames discussed herein. Frame implementations might include a subset of the different types of modular segments, depending on application, array size, packaging requirements, and other factors. FIG. 8 illustrates corner segments, also referred to as L-segments. FIG. 9 illustrates straight segments, also referred to as I-segments. FIG. 10 illustrates multi-junction segments, also referred to as T-segments. FIG. 11 illustrates expansion segments.

The modular segments discussed herein might interlock or nest with adjacent segments of a frame, such as with a corner segment, straight segment, perimeter segment, junction segment, expansion segment, or other type of segment. This nesting can be achieved by selecting diameters or cross-sectional widths of adjacent segments such that one segment fits or slides at least partially into the body of another segment. Various depth stops can be employed to ensure that a target depth of insertion is reached and not exceeded. Other techniques to join modular segments can be employed, such as insertable segment joint elements, welds, fasteners, or adhesives. Construction of modular segments can be achieved using subtractive manufacturing (e.g., machining, extrusion, or casting) or additive manufacturing (e.g., 3D printing) can be employed.

Figure 12:
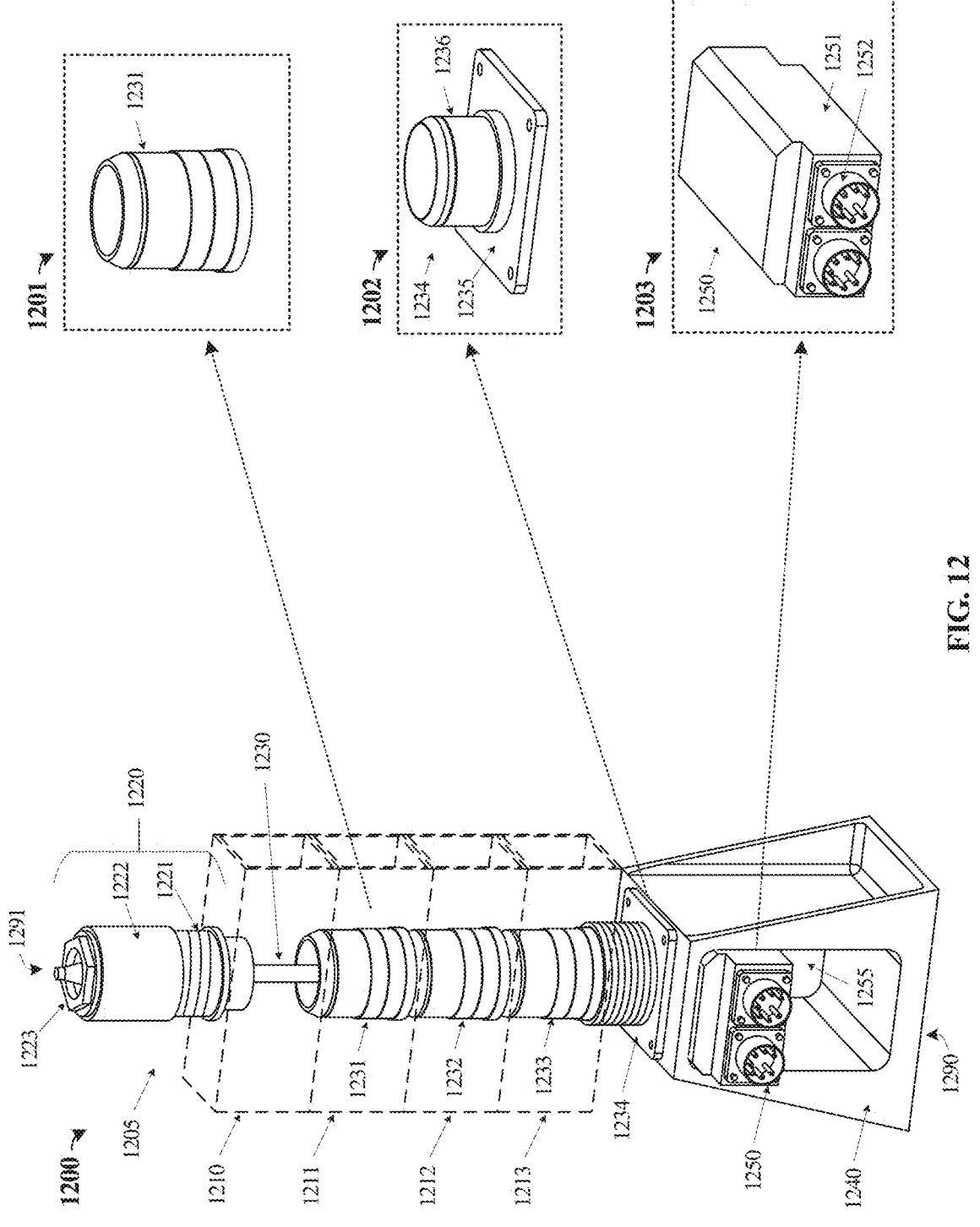
FIG. 12 illustrates stowage assembly features for a solar panel assembly in an implementation.
Figure 13:
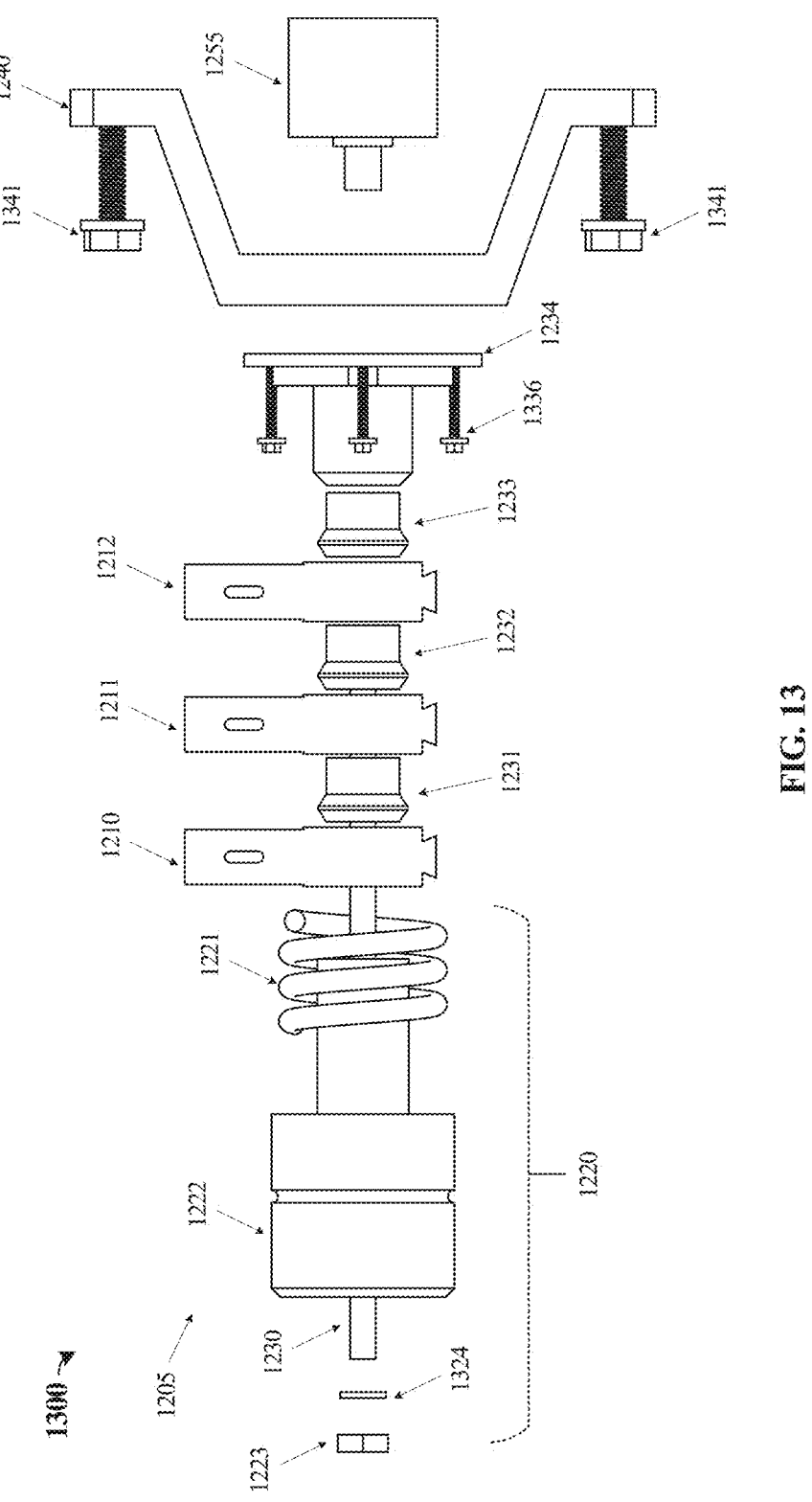
FIG. 13 illustrates stowage assembly features for a solar panel assembly in an implementation.
Figure 14:
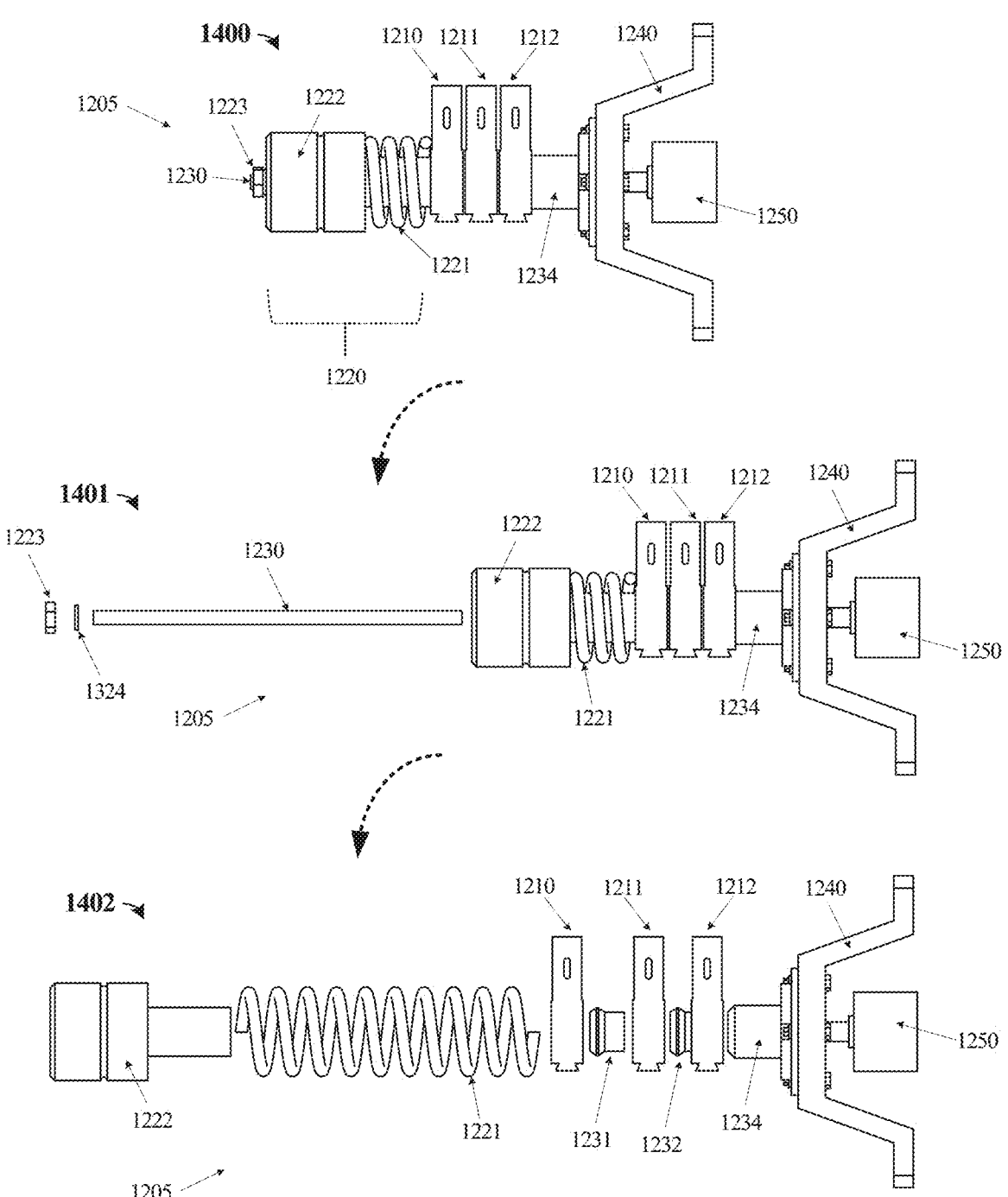
FIG. 14 illustrates deployment operations for a solar panel assembly in an implementation.

Turning first to FIG. 8, views 800-801 illustrate isometric views of corner segment (or L-segment) 810. Corner segment 810 comprises a modular segment which can merge or join corners of the various frames discussed herein. Corner segment 810 comprises segment body 811, stowage aperture 812, expansion adjustment slots 813, hinge mounting elements 814, and joint apertures 820-821. During assembly of a frame, expansion segments might be inserted into joint apertures 820 or 821, and the amount of expansion can be adjusted through slots 813, which may include set screws or adjustment rods/pins (not shown for clarity) which protrude through slots 813. Also, hinge assemblies can be coupled to corner segment 810 on hinge mounting elements 814. Hinge mounting elements 814 are shown as dovetail features, onto which a mating dovetail included on a hinge assembly can be slid and secured with a fastener or other element. Not all of hinge mounting elements 814 might be employed for a particular application or panel, and the quantity of hinge mounting elements 814 can be selected to support a range of installation and assembly configurations. Finally, stowage aperture 812 can have a stowage rod element inserted therethrough for stowage of more than one panel/frame during transport, launch, and pre-deployment operations. Example stowage/deployment mechanisms are shown in FIGS. 12-14.

Turning next to FIG. 9, views 900-901 illustrate isometric views of straight segment (or I-segment) 910. Straight segment 910 comprises a modular segment which can merge or join any among the various modular segments used in the frames discussed herein. Straight segment 910 comprises segment body 911, stowage aperture 912, expansion adjustment slots 913, hinge mounting elements 914, and joint apertures 920-921. During assembly of a frame, expansion segments might be inserted into joint apertures 920 or 921, and the amount of expansion can be adjusted through slots 913, which can be similar in operation/function to features 813 of segment 810. Also, hinge assemblies can be coupled to straight segment 910 on hinge mounting elements 914. Hinge mounting elements 914 are shown as dovetail features, which can be similar in operation/function to features 814 of segment 810. Finally, stowage aperture 912 can have a stowage rod element inserted therethrough for stowage of more than one panel/frame during transport, launch, and pre-deployment operations. Example stowage/deployment mechanisms are shown in FIGS. 12-14.

Turning next to FIG. 10, views 1000-1001 illustrate isometric views of multi-junction segment (or T-segment) 1010. T-segment 1010 might be employed to support cross-members in individual frames, or when two frames or panels are joined to form a dual-panel or other multi-panel configuration that might or might not include hinges between such frames/panels. The larger multi-panel assembly can then be coupled to other panel assemblies using one or more hinge assemblies. T-segment 1010 comprises a modular segment which can concurrently merge or join several ones among the various modular segments used in the frames discussed herein. T-segment 1010 comprises segment body 1011, stowage aperture 1012, expansion adjustment slots 1013, hinge mounting elements 1014, and joint apertures 1020-1022. During assembly of a frame, expansion segments might be inserted into joint apertures 1020-1022, and the amount of expansion can be adjusted through slots 1013, which can be similar in operation/function to features 813 of segment 810. Also, hinge assemblies can be coupled to T-segment 1010 on hinge mounting elements 1014. Hinge mounting elements 1014 are shown as dovetail features, which can be similar in operation/function to features 814 of segment 810. Finally, stowage aperture 1012 can have a stowage rod element inserted therethrough for stowage of more than one panel/frame during transport, launch, and pre-deployment operations. Example stowage/deployment mechanisms are shown in FIGS. 12-14.

Turning now to FIG. 11, view 1100 illustrates an isometric views of expansion segment 1110, and view 1101 illustrates a cross-sectional view of expansion segment 1110 (including a cross-section of expansion member 1116). Expansion segment 1110 comprises a modular segment which can merge or join any among the various modular segments used in the frames discussed herein. Expansion segment 1110 comprises first body section 1111, second body section 1112, section separation flange 1113, fastener hole 1114, expansion adjustment hole 1115, expansion element 1116, and joint apertures 1120-1121. During assembly of a frame, expansion segment 1110 might be inserted into joint apertures of adjacent modular segments. Typically, both among first body section 1111 and second body section 1112 are inserted into adjacent segments up to the depth of flange 1113. Expansion element 1116 can then act against an adjacent modular segment to apply an expansion force onto the corresponding segments and frame. As mentioned above, the amount of expansion can be adjusted through adjustment hole 1115, which can be accessible through corresponding adjustment slots of a mated segment.

Expansion element or expansion member 1116 can comprises a helical spring, such as that shown in FIG. 11. When inserted into an adjoining segment, expansion member 1116 can be compressed from the insertion action, and this compression can translate into an expansion force exerted onto the adjoining segment and, consequently, the frame perimeter. Other forms of expansion members can be employed, such as gas/fluid pistons, leaf spring elements, cable-spring tension elements, and other elements.

FIGS. 12-14 illustrate example implementations of stowage/deployment mechanisms for solar panel assemblies and solar panel systems. These stowage/deployment mechanisms can be referred to as rod ejectors, based in part on specific implementations which include a rod element.

Beginning with FIG. 12, views 1200-1203 illustrate isometric views of solar panel system 1205 and corresponding components. View 1200 includes four (4) solar panel assemblies 1210-1213 in a stacked or stowed arrangement. Only short portions of solar panel assemblies 1210-1213 are shown for context and clarity, such as portions of perimeter segments or other modular segments having stowage apertures formed therein. Rod element 1230 is disposed through each of the stowage apertures, within intervening shear ties 1231-1233 included on rod element 1230 and inserted at least partially into the stowage apertures. Shear ties 1231-1233 act as spacers between each of solar panel assemblies 1210-1213, provide for fitment of rod element 1230 into the larger diameter stowage apertures, and can add a layer of spacing, cushioning, or vibration protection between each of solar panel assemblies 1210-1213 during transport, launch, or other pre-deployment operations.

Proximal end 1290 of solar panel system 1205 includes base structure 1240 which can be coupled to a host vehicle or satellite. Base structure 1240 includes deployment electronics 1250 which are coupled to and control operation of deployer element 1255 (partially hidden from view). Deployer element 1255 can selectively hold or release rod element 1230 based on control signaling provided by deployment electronics 1250 responsive to commands received over control interfaces 1252 (see view 1203).

Rod element 1230 includes end cap assembly 1220 positioned on distal end 1291, which provides a clamping or holding force onto a stackup comprising solar panel assemblies 1210-1213, shear ties 1231-1233, flange/mount 1234, and base structure 1240. End cap assembly 1220 is configured to cap spring 1221 against an outermost of the solar panel assemblies (assembly 1210). End cap assembly 1220 includes cap spring 1221, collar 1222, and retaining nut 1223. View 1201 shows a detailed view of shear tie 1231. Shear tie 1231 can comprise various materials, such as polymers or composites, among other suitable materials discussed herein.

View 1202 shows a detailed view of flange/mount 1234 which attaches to base structure 1240 and provides a sleeve onto which a stowage aperture of solar panel assembly 1213 can sit. Finally, view 1203 provides a detailed view of deployment electronics 1250 comprising housing 1251 and connectors associated with control interfaces 1252. Control interfaces 1252 can couple to one or more external systems to receive power for deployment electronics 1250 and for deployment, as well as communication interfaces configured to receive commands or instructions from control elements of a host vehicle and provide status to such control elements. Control interfaces 1252 can comprise discrete control/power signaling, or may include one or more communication interface protocols and associated signaling.

FIG. 12 illustrates a stowed or pre-deployed state for solar panel system 1205. In operation, a commanded deployment can occur at a selected point. This deployment will release at least one among end cap assembly 1220 and rod element 1230 from base structure 1240, and rod element 1230 can exit through the stowage apertures of solar panel assemblies 1210-1213 and allow for opening (e.g., deployment) of solar panel assemblies 1210-1213 using associated self-opening hinge assemblies (not shown in FIG. 12).

FIG. 13 shows additional implementations of a solar panel system 1205 in an exploded view 1300. The axial alignment of the various elements is seen more clearly in FIG. 13, as well as the relationship with deployer 1255. Additional components are visible in view 1300, such as optional cap washer 1324, the spring portion of cap spring 1221, deployer 1255, and various fasteners/bolts 1336 and 1341. The spring portion of cap spring 1221 can comprise a helical spring having a 1-inch compressed length and a 5-inch uncompressed length, which provides approximately 5 pounds of force when released from a compressed state. Collar 1222 can comprise a metallic mass, such as aluminum 6061-T651 or other materials. Rod 1230 might comprise a stainless-steel rod of suitable diameter, such as 10/32".

Deployer 1255 holds a tensile preload (e.g., rod element 1230) until commanded to release. Deployer 1255 can comprise an electrically initiated release mechanism, such as a non-pyrotechnic hold down and release mechanism (HDRM), or other mechanism that employs a fuse-wire system which is released with a sufficient electrical current. Example currents can be in the range of 6 amps applied for 10 milliseconds. Other examples of deployer 1255 can include linear motors, shape memory alloy deployers, wax (paraffin) charge-actuated motors, or thermal knife mechanisms. Once commanded to deploy, deployer 1255 releases rod element 1230, which ejects along the axial length of solar panel system 1205 and frees collar 1222, allowing cap spring 1221 to expand from a compressed state to an uncompressed state. This allows individual panel assemblies to deploy/unfold.

FIG. 14 shows an example sequence of deployment for the rod ejector or stowage/deployment mechanism of solar panel system 1205. View 1400 shows a pre-deployment or stowed state for solar panel system 1205. Once deployer 1250 is commanded to deploy rod element 1230, view 1401 shows rod element 1230 ejected from solar panel system 1205 along with (retaining nut 1223 and washer 1324). From here, cap spring 1221 can expand, pushing collar 1222 axially and providing clearance for solar panel assemblies 1210-1212 to open/unfold. Shear ties 1231-1233 can be discarded as well, or may be retained to reduce the quantity of freed elements. Also, rod element 1230, collar 1222, retaining nut 1223, and washer 1324 can be discarded or retained. However, the ejection force applied to rod element 1230, collar 1222, retaining nut 1223, and washer 1324 typically ensures eventual re-entry if employed in an orbital environment.

Figure 15:
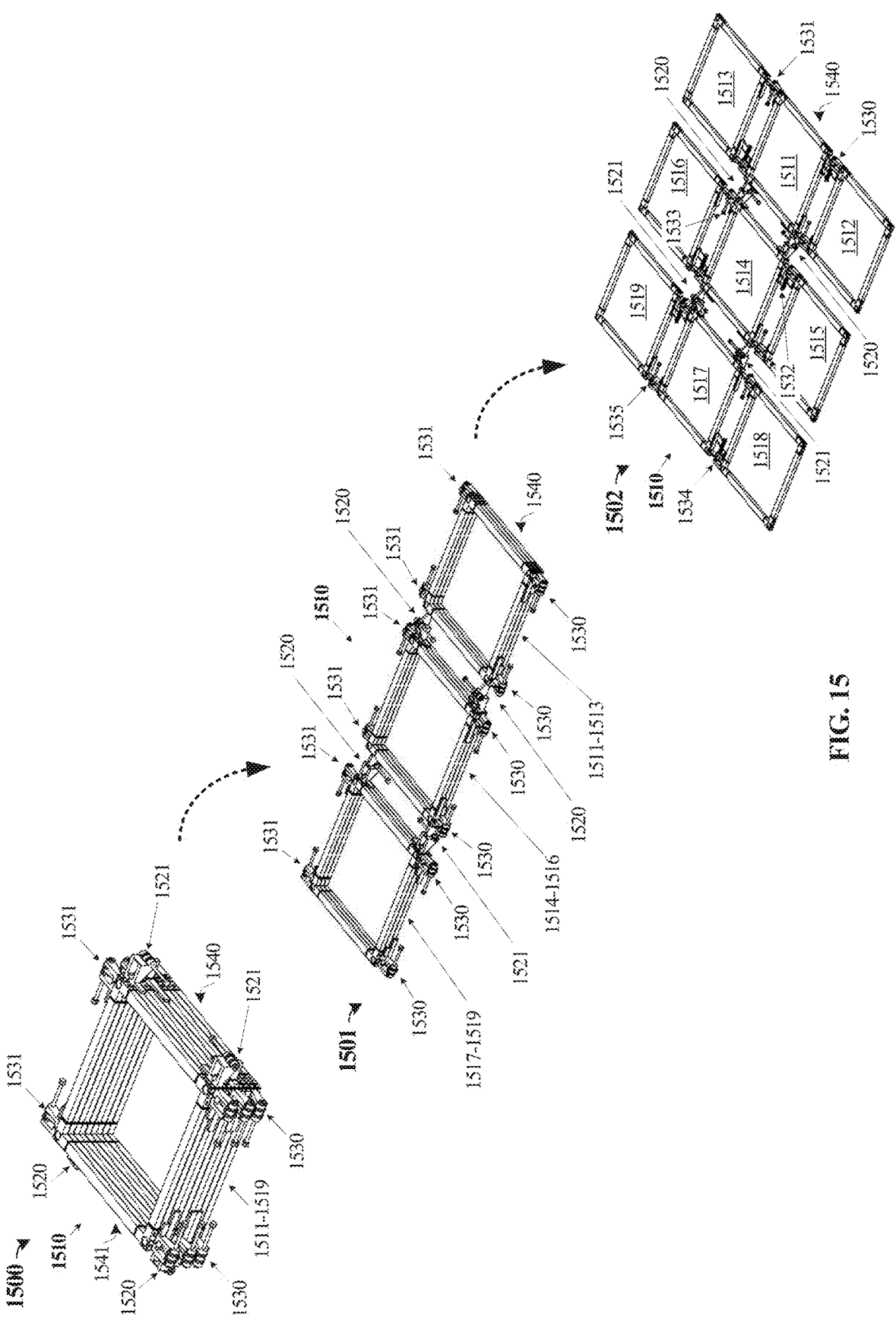
FIG. 15 illustrates multi-tier deployment for solar panel assemblies in an implementation.

FIG. 15 shows an example deployment operation for a collection of solar panel assemblies, namely for solar panel system 1510. Flexible photovoltaic panels (e.g., membranes) and optional cross-members are omitted in FIG. 15 for clarity, and these can be included or installed in other examples. View 1500 illustrates an initial pre-deployment state of solar panel system 1510. View 1501 shows a first phase or tier of deployment for solar panel system 1510. View 1502 shows a second phase or tier of deployment for solar panel system 1510. This deployment might occur after a satellite or other host vehicle reaches a selected destination, orbit, trajectory, or station. The tiered or phased deployment featured in FIG. 15 includes a multi-step operation used to deploy a first set of solar panel assemblies before subsequent sets of solar panel assemblies. Although FIG. 15 shows a particular quantity of nine (9) panels and example panel connection/deployment configuration, a subset of this quantity or configuration might instead be employed, such as a single tier deployment which can correspond to the examples seen in FIGS. 1-2. Example sizes include 60" square panels (i.e., 2.5 $m^2$/panel), with a 3×3 array of such panels each being 0.5" thick. Other examples might include 6 panels of 77" square panels (i.e., 3.8 $m^2$/panel). Example power outputs can include approximately 1-10 kilowatts (kW) or more.

View 1500 illustrates an initial state of solar panel system 1510, which comprises a stowed or pre-deployment configuration. A stowage/deployment mechanism, such as that seen in FIGS. 12-14 can be employed to stow solar panel system 1510 until a triggered or commanded deployment. As seen in view 1500, solar panel assemblies 1511-1519 are in a stacked or folded arrangement having various hinge assemblies 1520, 1521, 1530, and 1531 coupling adjacent solar panel assemblies. A proximal end 1540 can be attached to a host vehicle, such as a satellite, and a distal end 1541 can be unattached to the host vehicle to allow for extension and deployment of solar panel system 1510. Temporary strapping or fastening of distal end 1541 of solar panel system 1510 might be included until deployment. Each solar panel assembly can include a construction that comprises modular segments with expansion members that establish a radial tension over mounted flexible photovoltaic panels. Thus, nine (9) flexible photovoltaic panels can be included, each mounted within a corresponding rigid perimeter frame. Hinge assemblies 1520, 1521, 1530, and 1531 comprise self-opening, self-extending, or self-deploying hinge elements, such as those employing a torsional spring or motor to open leaves of each spring when released from stowage.

In view 1501, sub-assemblies comprising solar panel assembly sets deploy from proximal end 1540 outward in the distal direction based on extension or opening of hinge assemblies 1520 followed by opening of hinge assemblies 1521. This process comprises a first phase or tier of deployment. Specifically, hinge assemblies 1520 coupled to a first set of solar panel assemblies (1511-1513) open to extend a second set of solar panel assemblies (1514-1516) coupled to a third set of solar panel assemblies (1517-1519) by hinge assemblies 1521. Then, the third set of solar panel assemblies extend from the second set of solar panel assemblies based on the opening of hinge assemblies 1521.

View 1502 shows a second phase or tier of deployment for solar panel system 1510. In this second phase, hinge assemblies 1530-1531 open which deploys solar panel assemblies 1512 and 1513 from solar panel assembly 1511. Similarly, hinge assemblies 1532-1533 open which deploys solar panel assemblies 1515 and 1516 from solar panel assembly 1514. Finally, hinge assemblies 1534-1535 open which deploys solar panel assemblies 1518 and 1519 from solar panel assembly 1517. The deployment of these three second phase/tier sets of solar panel assemblies can occur sequentially or concurrently. Once solar panel assemblies 1511-1519 are fully deployed, one or more locking mechanisms can optionally be employed to ensure that the deployment remains established. For example, each hinge assembly might include a locking mechanism once opened. Alternatively, the spring force of each self-opening hinge might provide sufficient force for deployment and locking.

Thus, the examples herein describe enhanced compact, foldable and deployable solar panel systems and solar panel assemblies. These solar panel systems and solar panel assemblies can attach to host vehicles, such as spacecraft or satellites. In one example, solar panel assemblies each comprise a frame defining a mounting area formed from modular segments having receiving features configured to accept spline elements that mount a perimeter of a flexible photovoltaic panel into the mounting area and apply a radial tension to the flexible photovoltaic panel. A stowage mechanism is configured to hold the solar panel assemblies in a stacked configuration until deployment. The stowage mechanism can comprise a rod assembly disposed through apertures in the frames of each of the solar panel assemblies. A panel deployment mechanism can be configured to deploy the solar panel assemblies from the stacked configuration into a deployed configuration. The panel deployment mechanism can comprise self-opening hinges attached between selected pairs of the frames. A stacked configuration can provide for a multi-tier deployment when the stowage mechanism is released, such that a first hinge-coupled set of the solar panel assemblies deploy before a second hinge-coupled set of the solar panel assemblies.

The modular segments can include perimeter segments, expansion segments, and corner segments, among other segments. Perimeter segments can comprise flexible panel receiving features and are positioned along sides of the frames. The perimeter segments can also have tubular ends configured to receive ends of the expansion segments or other modular segments. The expansion segments can comprise expansion members that apply the radial tension to the flexible photovoltaic panels. The corner segments are be configured to mate the sides (e.g., perimeter segments) of corresponding frames to form the mounting areas. The corner segments can have tubular ends configured to receive ends of the expansion segments or other modular segments. Thus, the frames are assembled by nesting expansion segments between perimeter segments and corner segments (among other modular segments), and inserting the spline elements into the receiving features to secure the flexible photovoltaic panels into the frames. The flexible photovoltaic panels each can comprise a flexible membrane substrate having an array of photovoltaic cells mounted thereto. The flexible membrane substrate can include loops or tabs along a perimeter. The spline elements are mounted along at least a portion of a perimeter of the flexible membrane substrates by tabs or loops formed into the flexible membrane substrates.

Various materials can be selected for the elements discussed herein in any of the preceding Figures. These include materials selected for the various modular segments, materials selected for expansion elements, material selected for hinge assemblies, and materials selected for membranes or substrates of the flexible photovoltaic panels, as well as materials for the various fasteners, joints, adhesives, coatings, paints, and other surface treatments. Example materials for modular segments, hinge assemblies, splines, rod elements, and expansion elements include aluminum, steel, stainless steel, nickel, magnesium, titanium, and other metals and alloys thereof. One implementation of perimeter segments include McMaster-Carr 88875K12 6063 aluminum tube sections. Alternative materials can include composite materials, carbon fiber reinforced resins, polymers, organic materials, and combinations thereof. Material compositions are typically selected to structurally support the corresponding arrangements and expansion/tension requirements for the particular application. Example materials for the membranes or substrates of the flexible photovoltaic panels include flexible dielectric or insulating substrates such as polyamide, Kapton, mesh, fabric, and the like, which provide for flexibility and non-rigidity. Conductive substrates might be employed with non-conductive coatings applied thereto to prevent charge accumulation, electrical shorting, or sneak paths for circuitry of the solar panel or photovoltaic cells. Additionally, deployment into vacuum environments, orbital environments, or radiation-prone environments can steer material selection to avoid off-gassing, irradiation damage, ion-liberation, degradation, embrittlement, or other unwanted effects over a selected equipment lifetime and operating duration/range.

The frame components, including modular segments and perimeter segments, can have rectangular or square cross-sectional profiles, such as those shown herein. However, other cross-sectional profiles can be employed, such as cylindrical, triangular, hexagonal, or irregular, including combinations thereof and combinations with rectangular or square cross-sectional profiles.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A system, comprising:
solar panel assemblies each comprising a perimeter frame having a perimeter expansion segment that applies a radial tension to a flexible photovoltaic panel mounted into a central mounting area by spline elements inserted into loops disposed about edges of the flexible photovoltaic panel and retained by spline receiving features on the modular perimeter frame; and
a stowage mechanism configured to hold the solar panel assemblies in a stacked configuration; and
a deployment mechanism configured to deploy the solar panel assemblies from the stacked configuration into a deployed configuration and comprising self-opening hinges attached between selected pairs of the perimeter frames.

2. The system of claim 1, wherein the stacked configuration provides for a multi-tier deployment when the stowage mechanism is released such that a first hinge-coupled set of the solar panel assemblies deploy before a second hinge-coupled set of the solar panel assemblies.

3. The system of claim 1, wherein the stowage mechanism includes a rod assembly comprising:
a rod element disposed through apertures in the perimeter frames of each of the solar panel assemblies and having intervening shear ties positioned on the rod element at least partially in the apertures as spacers between each of the solar panel assemblies; and
an end cap configured to hold the rod element against an outermost of the solar panel assemblies; and
a deployer configured to release at least one among the end cap and the rod element to allow the self-opening hinges to expand and deploy the solar panel assemblies.

4. The system of claim 1, wherein the self-opening hinges each comprise:
a clevis element having a height selected to accommodate a selected intervening quantity of the solar panel assemblies stacked between hinge-coupled ones of the solar panel assemblies.

5. The system of claim 1, wherein the modular segments comprise:
perimeter segments comprising that form sides of the frames and comprising the spline receiving features;
the perimeter expansion segments comprising expansion members that provide circumferential expansion to the perimeter frame and apply the radial tension to the flexible photovoltaic panels; and
corner segments configured to mate the sides of corresponding perimeter frames to form the mounting areas.

6. The system of claim 5, comprising:
the perimeter segments having tubular ends configured to receive first ends of the expansion segments;
the corner segments having tubular ends configured to receive second ends of the expansion segments; and wherein the perimeter frames are assembled by nesting the expansion segments between the perimeter segments and the corner segments, and inserting the spline elements into the spline receiving features.

7. The system of claim 1, comprising:
at least one among the modular segments of each of the perimeter frames comprising mounting features configured to attach corresponding leaves of the self-opening hinges.

8. The system of claim 1, comprising:
the flexible photovoltaic panels each comprising a flexible membrane substrate having an array of photovoltaic cells mounted thereto;
wherein the loops are formed into the flexible membrane substrates.

9. The system of claim 1, comprising:
a spacecraft coupled to at least one of the solar panel assemblies.

10. A solar panel assembly, comprising:
a perimeter frame having perimeter expansion segments that apply a radial tension to a flexible photovoltaic panel mounted into a central mounting area
the perimeter frame comprising spline receiving features configured to accept spline elements positioned into loops disposed about a perimeter of the flexible photovoltaic panel and mount the flexible photovoltaic panel into the central mounting area.

11. The solar panel assembly of claim 10, comprising:
the perimeter frame formed from interconnected modular segments having perimeter segments, the perimeter expansion segments, and corner segments;
the perimeter segments comprising the spline receiving features and positioned along sides of the perimeter frame;
the perimeter expansion segments configured to establish a circumferential force about the perimeter frame to apply the radial tension; and
the corner segments configured to mate the sides of the perimeter frame to form the mounting area.

12. The solar panel assembly of claim 11, comprising:
the perimeter segments having tubular ends configured to receive first ends of the perimeter expansion segments;
the corner segments having tubular ends configured to receive second ends of the perimeter expansion segments; and
wherein the perimeter frame is assembled by nesting the perimeter expansion segments between the perimeter segments and the corner segments, and inserting the spline elements into the receiving features.

13. The solar panel assembly of claim 10, comprising:
the flexible photovoltaic panel comprising a flexible membrane substrate having an array of photovoltaic cells mounted thereto;
wherein the spline elements are mounted to along at least a portion of a perimeter of the flexible membrane substrate by the loops formed into the flexible membrane substrate.

14. The solar panel assembly of claim 10, comprising:
at least one among the interconnected modular segments comprising mounting features configured to attach a panel deployment hinge configured to rotatably couple the perimeter frame to a second perimeter frame having a second flexible photovoltaic panel mounted thereto.

15. The solar panel assembly of claim 14, comprising:
corner segments among the interconnected modular segments comprising apertures formed perpendicular to the mounting area configured to accept corresponding panel stowage rods therethrough.

16. The solar panel assembly of claim 15, wherein based on the solar panel assembly being in a stowed state, the panel deployment hinge is maintained in a closed configuration by compression of one or more of the corner segments of the perimeter frame to one or more of the corner segments of the second perimeter frame with an intervening shear tie positioned about a corresponding panel stowage rod; and wherein based on the solar panel assembly being released from the stowed state, the panel deployment hinge is configured to exert a deployment force between the perimeter frame and the second perimeter frame upon ejection of the corresponding panel stowage rod.

17. The solar panel assembly of claim 14, comprising:

the panel deployment hinge mounted to the perimeter frame and comprising a clevis portion having a height selected based at least on a quantity of additional perimeter frames positioned between the perimeter frame and the second perimeter frame when the solar panel assembly is in a stowed state.

\* \* \* \* \*